US011422450B2

United States Patent
Guo et al.

(10) Patent No.: US 11,422,450 B2
(45) Date of Patent: Aug. 23, 2022

(54) LIGHT SOURCE APPARATUS AND DISPLAY DEVICE

(71) Applicant: Appotronics Corporation Limited, Shenzhen (CN)

(72) Inventors: Zu-Qiang Guo, Shenzhen (CN); Bing-Ke Yang, Shenzhen (CN); Yi Li, Shenzhen (CN)

(73) Assignee: Appotronics Corporation Limited, Shenzhen (CN)

(*) Notice: Subject to any disclaimer, the term of this patent is extended or adjusted under 35 U.S.C. 154(b) by 70 days.

(21) Appl. No.: 17/048,570

(22) PCT Filed: Dec. 3, 2018

(86) PCT No.: PCT/CN2018/118814
§ 371 (c)(1),
(2) Date: May 4, 2021

(87) PCT Pub. No.: WO2019/200931
PCT Pub. Date: Oct. 24, 2019

(65) Prior Publication Data
US 2021/0294191 A1  Sep. 23, 2021

(30) Foreign Application Priority Data

Apr. 16, 2018 (CN) .......................... 201810339372.5

(51) Int. Cl.
*G03B 21/20* (2006.01)
(52) U.S. Cl.
CPC .......... *G03B 21/204* (2013.01); *G03B 21/208* (2013.01)

(58) Field of Classification Search
CPC .... G03B 21/204; G03B 21/208; G03B 21/16; G03B 21/2066; G03B 21/2073; G03B 21/2033
See application file for complete search history.

(56) References Cited

U.S. PATENT DOCUMENTS

| 11,073,751 B2 * | 7/2021 | Guo ..................... F21V 13/00 |
| 2012/0242912 A1 * | 9/2012 | Kitano ................... F21V 9/08 362/19 |

(Continued)

FOREIGN PATENT DOCUMENTS

| CN | 203217230 U | 9/2013 |
| CN | 106383428 A | 2/2017 |
| CN | 107272312 A | 10/2017 |

*Primary Examiner* — Tsion Tumebo
(74) *Attorney, Agent, or Firm* — ScienBiziP, P.C.

(57) ABSTRACT

A light source device, comprising an excitation light source, a wavelength conversion element, a transparent substrate, and a light splitter. The wavelength conversion element comprises a wavelength conversion area and a scattering area. The excitation light source emits excitation light that has a first polarization state. The transparent substrate guides first part of the excitation light to the scattering area and guides second part of the excitation light to the light splitter; and the light splitter guides, directly or by means of a guiding device, the second part of the excitation light to the wavelength conversion area. The scattering area scatters the first part of the excitation light and guides the scattered first part of the excitation light to the transparent substrate; and the transparent substrate and the light splitter guide the scattered first excitation light to a light-emitting channel directly or by means of the guiding device.

20 Claims, 6 Drawing Sheets

(56) References Cited

U.S. PATENT DOCUMENTS

| | | | |
|---|---|---|---|
| 2015/0002823 A1* | 1/2015 | Yan | G02B 27/0905 |
| | | | 353/31 |
| 2016/0241822 A1* | 8/2016 | Takagi | G02B 26/008 |
| 2017/0184254 A1* | 6/2017 | Yamashita | G03B 21/204 |
| 2017/0269463 A1* | 9/2017 | Katsumata | G02B 7/008 |
| 2018/0231883 A1 | 8/2018 | Hu et al. | |
| 2020/0026171 A1* | 1/2020 | Hsieh | B32B 7/12 |

\* cited by examiner

LIGHT SOURCE APPARATUS AND DISPLAY DEVICE

TECHNICAL FIELD

The present disclosure relates to a light source device and a display apparatus.

BACKGROUND

At present, laser light sources are becoming more and more widely used in display (such as the projection field) and lighting fields. Due to advantages of high energy density and small etendue, the laser light sources have gradually replaced light bulbs and LED light sources in a field of high-brightness light sources. Among them, a light source device that uses a laser light source as an excitation light source to excite wavelength conversion material to generate required light (for example, blue laser light excites yellow wavelength conversion material to generate white light or light of a specific color) has become the mainstream of applications because of its advantages such as high luminance efficiency, good stability, low cost etc. However, how to ensure high light utilization efficiency in the current light source device is an important technical problem.

SUMMARY

In view of the above, it is necessary to provide a light source device with high light utilization efficiency, and it is also necessary to provide a display apparatus adopting the light source device.

A light source device, comprising an excitation light source, a wavelength conversion element, a transparent substrate, and a light splitter, the wavelength conversion element comprising a wavelength conversion area and a scattering area, wherein the light source device is configured to emit excitation light having a first polarization state; the transparent substrate is configured to guide a first part of the excitation light to the scattering area, and to guide a second part of the excitation light to the light splitter which guides the second part of the excitation light to the wavelength conversion area directly or through a guiding device; the scattering area is configured to scatter the first part of the excitation light and to guide the first part of the excitation light after being scattered to the transparent substrate, the transparent substrate and the light splitter are further configured to guide the first part of the excitation light after being scattered to a light-emitting channel directly or through the guiding device; the wavelength conversion area is configured to perform wavelength conversion on the second part of the excitation light to generate excited light and to guide the excited light to the light-emitting channel directly or through the guiding device, or through the guiding device and the light splitter.

A display apparatus, comprising a light source device comprising an excitation light source, a wavelength conversion element, a transparent substrate, and a light splitter, the wavelength conversion element comprising a wavelength conversion area and a scattering area, wherein the light source device is configured to emit excitation light having a first polarization state; the transparent substrate is configured to guide a first part of the excitation light to the scattering area, and to guide a second part of the excitation light to the light splitter which guides the second part of the excitation light to the wavelength conversion area directly or through a guiding device; the scattering area is configured to scatter the first part of the excitation light and to guide the first part of the excitation light after being scattered to the transparent substrate, the transparent substrate and the light splitter are further configured to guide the first part of the excitation light after being scattered to a light-emitting channel directly or through the guiding device; the wavelength conversion area is configured to perform wavelength conversion on the second part of the excitation light to generate excited light and to guide the excited light to the light-emitting channel directly or through the guiding device, or through the guiding device and the light splitter.

Compared with the prior art, the light source device of the present disclosure uses the excitation light having the first polarization state, and thus the transparent substrate can guide the first part of the excitation light to the scattering area and can guide the second part of the excitation light to the wavelength conversion area through the light splitter directly or indirectly. The first part of the excitation light after being scattered by the scattering area and emitted therefrom is guided to the light-emitting channel through the transparent substrate and the light splitter, and the excited light emitted from the wavelength conversion area is also guided to the light exciting channel, such that the combined light emitted from the light exciting channel meets the predetermined brightness and color temperature. The cooperation of the excitation light of the first polarization state and the transparent substrate can control the light loss to be small, such that the light utilization efficiency of the light source device and the display apparatus using the light source device is relative high.

DESCRIPTION OF SYMBOLS OF MAIN COMPONENTS

| | |
|---|---|
| Light source device | 100、200、300、400、500、500' |
| Excitation light source | 101 |
| Convergent lens | 102、213、314 |
| Light homogenization device | 103 |
| Transparent substrate | 104、204、504、504' |
| Light splitter | 105、305、405 |
| Wavelength conversion element | 111、311、411 |
| Guiding device | 106 |
| Collection lens system | 107、108 |
| Wavelength conversion area | 110、210、410 |
| Scattering area | 109 |
| Guiding element | 106a、206a、306、406 |
| Supplementary light source | 212、312、413 |
| First area | 206b、306b、410a |
| Second area | 206c、306c、410b |
| Scattering and de-coherence device | 313 |
| Light spot | 421、422 |
| Anti-reflection film | 504d、504d' |
| Opening area | 504e、504e' |
| Excitation light spot | 502、502' |
| Scattered light spot | 503、503' |

The following specific embodiments will further illustrate the present disclosure in conjunction with the above drawings.

DETAILED DESCRIPTION

Figure 1:
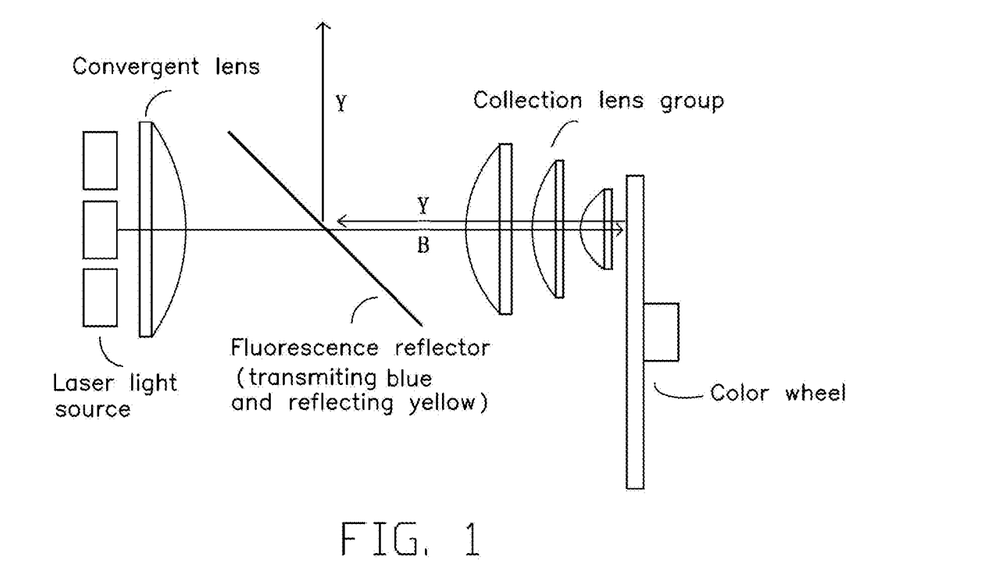
FIG. 1 is a schematic diagram of an optical path structure of a first kind of light source device adopting an excitation light source to excite wavelength conversion material.

Please refer to FIG. 1, FIG. 1 is a schematic diagram of an optical path structure of a first kind of light source device adopting an excitation light source to excite wavelength conversion material. For a reflective color wheel, a laser light beam (beam B in the figure) emitted from an excitation light source is converged by a lens and reaches the color wheel (wavelength conversion element) including wavelength conversion material after passing a fluorescence-reflecting reflector and a collection lens group. The wavelength conversion material is excited to produce yellow (or red, or green) fluorescence (beam Y in the figure), which is reflected by the fluorescence-reflecting reflector and then enters the rear optical system. The fluorescent reflector can be a dichroic color film for transmitting blue light and reflecting yellow light.

In this structure, a problem is how to combine the blue light with the fluorescence. Because of that the fluorescent reflector can transmit blue light and reflect yellow light, the fluorescence will be reflected there but the blue light reflected by the color wheel will be transmitted and will not enter the later optical system like the fluorescence. Therefore, it is needed to design a path of the blue light to realize a combination of the blue light and the fluorescence.

Figure 2:
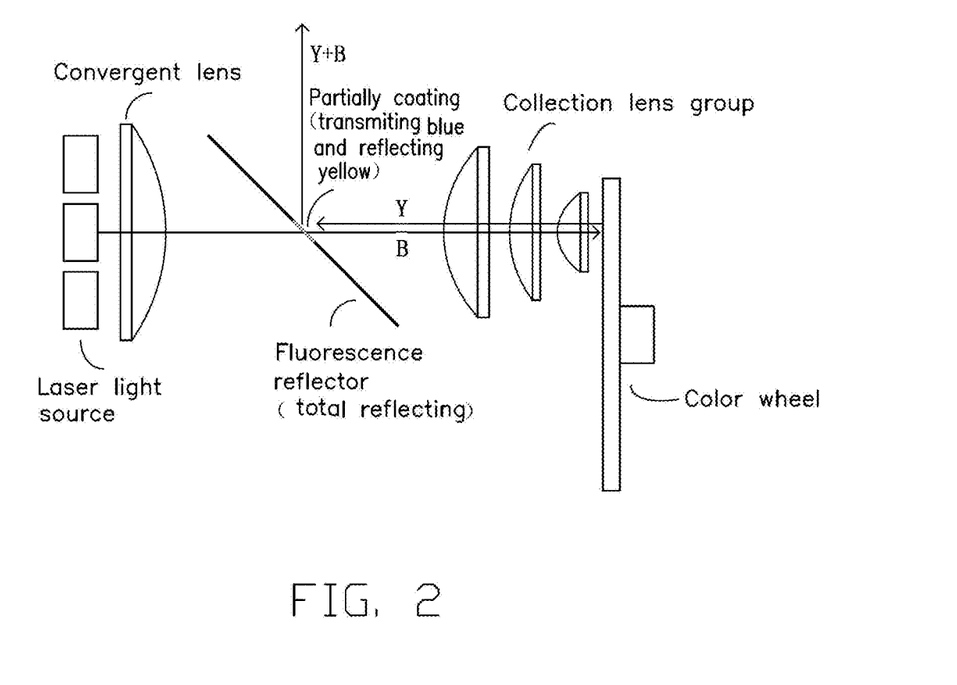
FIG. 2 is a schematic diagram of an optical path structure of a second kind of light source device adopting an excitation light source to excite wavelength conversion material.
Figure 3:
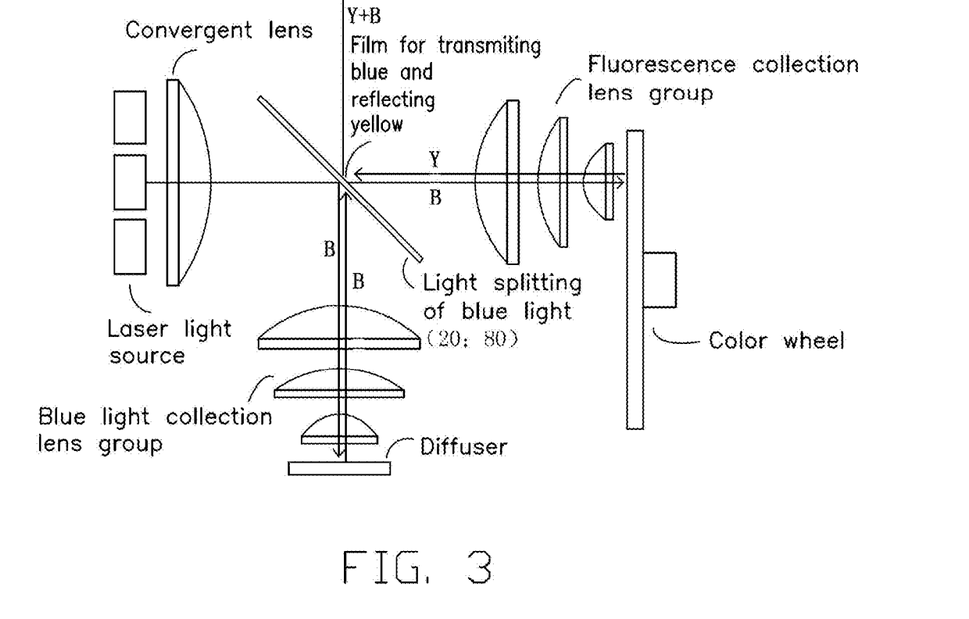
FIG. 3 is a schematic diagram of an optical path structure of a third kind of light source device adopting an excitation light source to excite wavelength conversion material.

Further, a solution as shown in FIGS. 2 and 3 can be used to realize the combination of the laser light and the fluorescence to emit white light directly (excluding a case of sequentially emitting color light sequence such as RGB lights, RGBY lights, YB lights, or the like in different time divisions and integrating into white light).

Please refer to FIG. 2, FIG. 2 is a schematic diagram of an optical path structure of a second kind of light source device adopting an excitation light source to excite wavelength conversion material. Based on the scheme shown in FIG. 1, the fluorescent reflector is configured to have different coatings in the center area and the surrounding area. The center area is configured to transmit blue light and reflect yellow light, while the surrounding area is configured to reflect all visible light. After collected by the collection lens, the laser light beam is converged into a small light spot at the position of the fluorescent reflector, transmits through the center area, then passes through the collection lens and excites to generate fluorescence on the color wheel. A mixing ratio of the fluorescent material can be controlled such that part of the blue light is used to excite the wavelength conversion material and converted into fluorescence, and the other part of the blue light is scattered into Lambertian light having an etendue equivalent to an etendue of the fluorescence. As such, the fluorescence and the blue light are mixed to achieve white balance. After that, the blue light passes through the collection lens group and reaches the fluorescent reflector. At this time, the blue light in the surrounding area is reflected into the later optical system, while the blue light in the center area will be transmitted and lost. Because the laser light beam being converged is very small and an area occupied by the center area is also very small, the lost blue light can be ignored. Therefore, this scheme can also realize a good combination of the laser light and the fluorescence.

Further, please refer to FIG. 3, FIG. 3 is a schematic diagram of an optical path structure of a third kind of light source device adopting an excitation light source to excite wavelength conversion material. Different from the solution shown in FIG. 1, a front surface of the fluorescent reflector in the scheme shown in FIG. 3 is coated with a blue light splitting film for reflecting part of the blue light and transmitting the other part of the blue light, wherein a typical transmission/reflection ratio is 80:20. This ratio will affect color coordinates of white light that finally exits from the light source. A back surface of the fluorescent reflector is still coated with a film for transmitting blue light and reflecting yellow light. The laser light beam emitted from the laser light source is divided into a transmitted blue light beam and a reflected blue light beam on the front surface of the fluorescent reflector, wherein the transmitted blue light beam will be completely converted into fluorescence at the color wheel, and the fluorescence will be reflected by the fluorescent reflector into the later optical path. The reflected blue laser light beam which is separated out will be scattered into Lambertian light at the position of the diffuser in the figure, and will reach the fluorescent reflector after passing through the blue light collection lens group. At this time, the blue light will be split again, wherein 80% of the light is transmitted through the fluorescent reflector and enters the later optical path as a primary color light of B, while 20% of the light is reflected and lost. Although there is a certain (20%*20%=4%) loss in this scheme of optical path, the loss is not much and is within an acceptable range.

Figure 4:
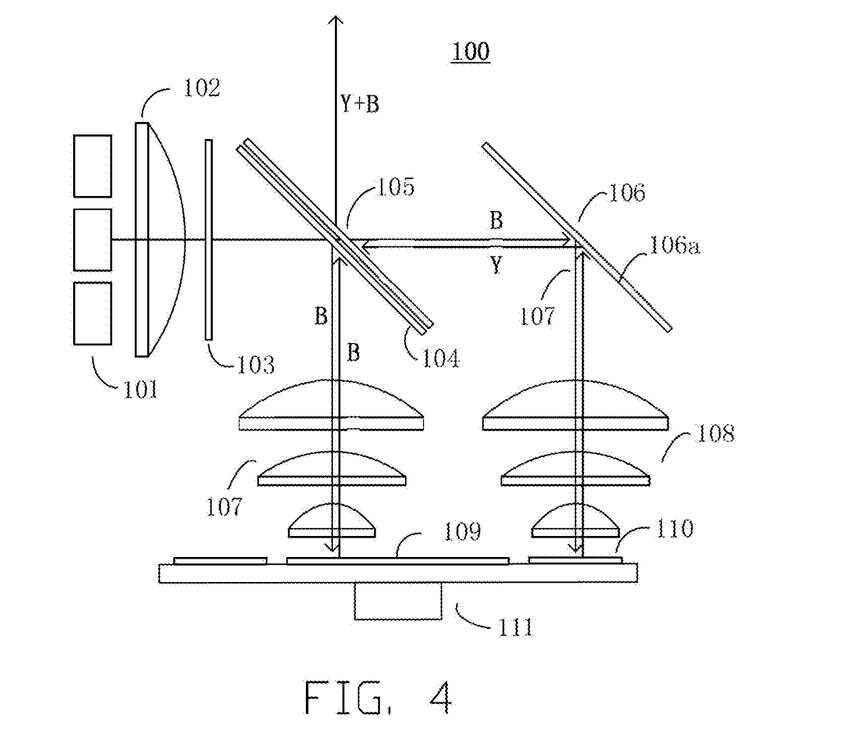
FIG. 4 is a schematic diagram of a structure of a light source device based on a first embodiment of the present disclosure.

However, in a light source device adopting an excitation light source to excite the wavelength conversion material, how to reduce light loss to a smaller range to improve the light utilization rate is an important technical problem. Please refer to FIG. 4, FIG. 4 is a schematic diagram of a structure of a light source device 100 in a first embodiment of the present disclosure. The light source device 100 includes an excitation light source 101, a convergent lens 102, a light homogenization device 103, a transparent substrate 104, a light splitter 105, a wavelength conversion element 111, a guiding device 106, and collection lens systems 107 and 108.

The excitation light source 101 is configured to emit excitation light having a first polarization state. In this embodiment, the excitation light source 101 is a laser light source, and the excitation light is blue laser light, such as blue laser light with a wavelength in a range of 440 nm-470 nm. Specifically, the excitation light source 101 may include multiple lasers, and the multiple lasers are configured to emit multiple laser light beams of the first polarization state as the excitation light.

The convergent lens 102 is on an optical path of the excitation light with the first polarization state emitted from the excitation light source 101, and the convergent lens 102 is configured to converge the excitation light having the first polarization state. The converged excitation light having the first polarization state is provided to the light homogenization device 103. The light homogenization device 103 may be at least one of a light-homogenization rod, a fly-eye lens group, or a diffuser, and is configured to homogenize the converged excitation light having the first polarization state. The homogenized excitation light having the first polarization state is provided to the transparent substrate 104. It should be understood that the light homogenization device 103 is configured to homogenize the excitation light (such as a Gaussian light beam) having the first polarization state into a relatively uniform laser light spot. In this embodiment, the first polarization state is the S polarization state. In a modified embodiment, the convergent lens 102 and the light homogenization device 103 may also be omitted.

The transparent substrate 104 is configured to guide the first part of the excitation light to the wavelength conversion element 111, and to guide the second part of the excitation light to the light splitter 105. The light splitter 105 can guide the second part of the excitation light to an area of the wavelength conversion element 111 directly or through the guiding device 106. In this embodiment, the light splitter 105 guides the second part of the excitation light to the guiding device 106, and the guiding device 106 guides the second part of the excitation light to another area of the wavelength conversion element 111.

The transparent substrate 104 may be white glass, which includes a first surface adjacent to a side of the excitation light source 102 and a second surface opposite to the first surface. Since the transparent substrate 104 is arranged to form a predetermined inclined angle, which is also called an incident angle and for which an angle of 45 degrees is taken as an example for an illustrative description in this embodiment, relative to the direction of the excitation light emitted from for example the excitation light source 101, the convergent lens 102, or the light homogenization device 103, and since the excitation light has the first polarization state, the first surface reflects a part of the excitation light having the first polarization state and also transmits the other part of the excitation light having the first polarization state to the second surface, and the second surface then reflects a part of the received excitation light, which is then emitted from the first surface, and transmits the other part of the received excitation light. Further, the excitation light reflected by the two surfaces of the transparent substrate 104 is defined as the first part of excitation light, and the excitation light transmitted through the two surfaces of the transparent substrate 104 is defined as the second part of excitation light.

Figure 6:
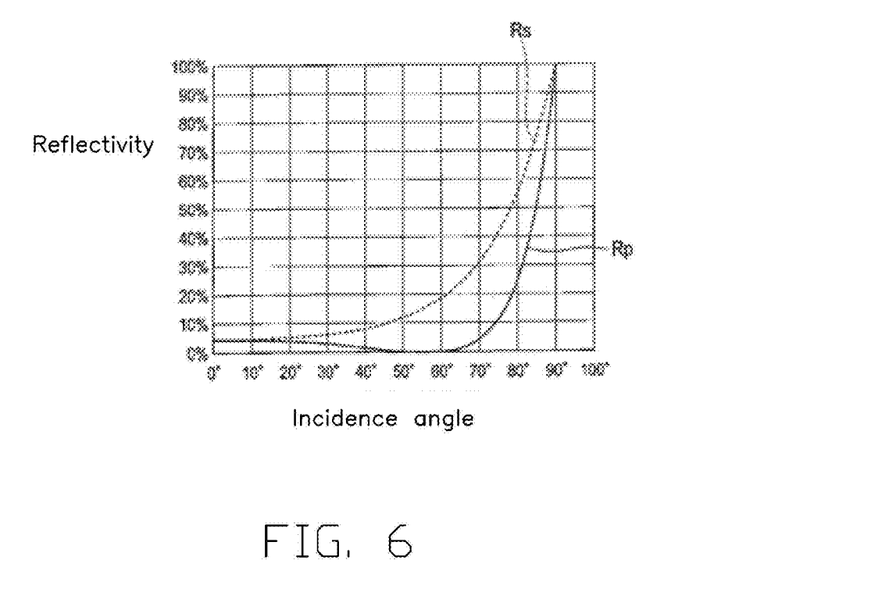
FIG. 6 is a schematic diagram of curves of reflectance and incidence angle of a transparent substrate of the light source device shown in FIG. 4 for light of two different polarization states.

Please refer to FIG. 6, FIG. 6 is a schematic diagram of curves of reflectance v. incidence angle of a transparent substrate of the light source device shown in FIG. 4 for light of two different polarization states. Rs is a curve of the reflectance v. the incidence angle of the transparent substrate 104 to the excitation light having the S polarization state, and Rp is a curve of the reflectance v. the incidence angle of the transparent substrate 104 to the excitation light having the P polarization state. For example, as shown in FIG. 6, the reflectance of the excitation light having the first polarization state (the S polarization state) on the first surface is about 9% if the incidence angle of the excitation light is 45°. That is, 9% of the incident excitation light is reflected by the first surface for the first time, and further, when the remaining approximately 91% of the light reaches the second surface, approximately 91%*9% is further reflected to the first surface. The 91%*9% of the excitation light exits from the first surface and is used as the first part of the excitation light (approximately 17% of the incident excitation light) together with the 9% of the incident excitation light reflected by the first surface for the first time. That is, the first part of the excitation light reflected by the transparent substrate is about 17% of the incident excitation light, and the rest of the excitation light is basically transmitted and is used as the second part of excitation light.

The light splitter 105 can transmit the excitation light, and thus transmits the second part of excitation light, and the second part of the excitation light that is transmitted can be directly or indirectly guided to the wavelength conversion element 111. The second part of the excitation light that is transmitted is guided to the wavelength conversion element 111 through the guiding device 106. In this embodiment, the light splitter 105 is arranged adjacent to the second surface of the transparent substrate 104. The light splitter 105 and the transparent substrate 104 may be parallel to each other with or without a gap therebetween, and FIG. 4 exemplarily illustrates a case that there is a small gap between the light splitter 105 and the transparent substrate 104 which is basically negligible. Further, it should be understood that in actual use, the light splitter 105 and the transparent substrate 104 may also be fixed together by glue or other fixing elements. The light splitter 105 may be a dichroic sheet, which can transmit blue light and reflect light of other colors (such as yellow light).

Figure 5:
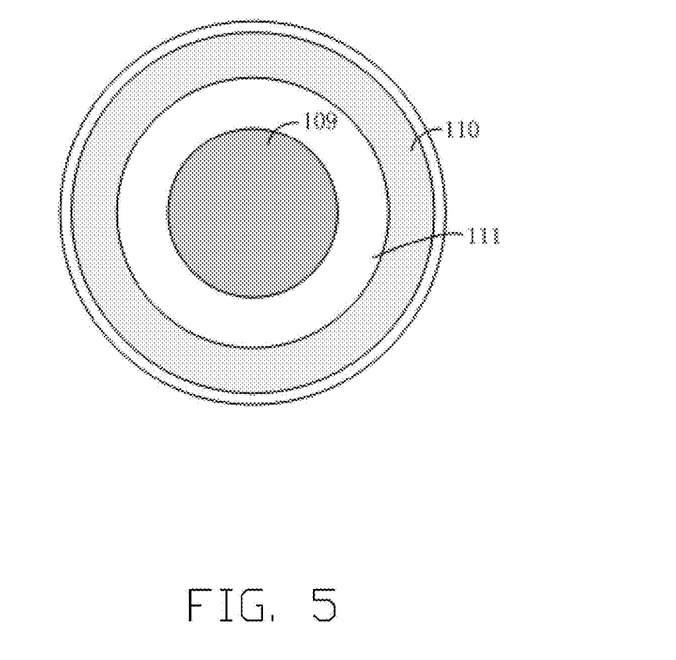
FIG. 5 is a schematic diagram of a structure of a wavelength conversion element of the light source device shown in FIG. 4.

Please refer to FIG. 5, FIG. 5 is a schematic diagram of a structure of a wavelength conversion element 111 of the light source device shown in FIG. 4. The wavelength conversion element 111 includes a wavelength conversion area 110 and a scattering area 109. In this embodiment, the wavelength conversion area 110 has a ring shape, and the scattering area 109 locates in the center of the ring shape of the wavelength conversion area 110. Specifically, there is an spacing area between the wavelength conversion area 110 and the scattering area 109, the spacing area and the wavelength conversion area 110 are both circular, the scattering area 109 is circular, and the scattering area 109, the spacing area, and the wavelength conversion area 110 are arranged to be concentric. It should be understood that, in a modified embodiment, the scattering area 109 may also be ring-shaped. In addition, the wavelength conversion element 111 may also include a rotation shaft corresponding to the center of the scattering area 110 and a drive motor connected to the rotation shaft, so that the wavelength conversion element 111 can rotate around the rotation shaft (in other words, the center of the scattering area 110) when the light source device is working.

The scattering area 109 may be provided with a scattering material and is a reflection area. The scattering area 109 is located on an optical path of the first part of the excitation light guided by the transparent substrate 104 and is configured to scatter the first part of the excitation light and guide the first part of the excitation light after being scattered to the transparent substrate 104. The transparent substrate 104 and the light splitter 105 are also configured to guide the first part of the excitation light after being scattered to a light-emitting channel. In this embodiment, the transparent substrate 104 and the light splitter 105 guide the first part of the excitation light after being scattered to the light-emitting channel directly by transmitting. However, in a modified embodiment, the transparent substrate 104 and the light splitter 105 can also guide the first part of the excitation light after being scattered to the light-emitting channel through the guiding device 106 or other guiding devices.

The wavelength conversion area 110 may be provided with a wavelength conversion material (for example, a yellow wavelength conversion material like a yellow phosphor; or red and green wavelength conversion materials like red and green phosphors) and is a reflection area. The wavelength conversion material can perform wavelength conversion on the excitation light to generate excited light. Specifically, the wavelength conversion area 110 is located on an optical path of the second part of the excitation light guided by the transparent substrate 104 and is configured to perform wavelength conversion on the second part of the excitation light to generate the excited light (such as yellow excited light). The wavelength conversion area 110 is also configured to guide the excited light to the light-emitting channel directly or light-emitting channel by the guiding device 106 or by the guiding device 106 and the light splitter 105. A combined light emitted from the light-emitting channel meets predetermined brightness and color temperature requirements. In this embodiment, the wavelength conversion area 110 is also configured to guide the excited light to the light-emitting channel through the guiding device 106 and the light splitter 105.

The guiding device 106 may include a guiding element 106a. In this embodiment, the guiding element 106a may be a reflector for reflecting the excitation light and the excited light.

The collection lens modules 107 and 108 are arranged adjacent to the scattering area 109 and the wavelength conversion area 110 and are configured to collect and concentrate the light provided to the scattering area 109, the light emitted from the scattering area 109, and/or the light provided to the wavelength conversion area 110 and the excited light generated by the wavelength conversion area 110. Specifically, in this embodiment, the collection lens module 107 is between the transparent substrate 104 and the scattering area 109, and the collection lens module 108 is between the guiding element 106a and the wavelength conversion area 110.

When the light source device 100 is working, the wavelength conversion element 111 rotates around its axis, the excitation light (such as B) emitted from the excitation light source 101 is provided to the transparent substrate 104 after being collected and converged through the convergent lens 102 and the light homogenization device 103, the transparent substrate 104 reflects the first part of the excitation light to the scattering area 109, and the scattering area 109 scatters and reflects the first part of the excitation light to the transparent substrate 104, wherein the first part of the excitation light after being scattered is Lambertian light with a polarization degree close to natural light and is basically transmitted to the light-emitting channel through the transparent substrate 104 and the light splitter 105. At the same time, the transparent substrate 104 also transmits the second part of excitation light which then is provided to the wavelength conversion area 110 after being transmitted by the light splitter 105 and reflected by the guiding device 106; the wavelength conversion area 110 receives the second part of the excitation light to generate the excited light (such as yellow excited light: Y), and reflects the excited light to the guiding device 106, the guiding device 106 reflects the excited light to the light splitter 105, and the light splitter 105 reflects the excited light to the light-emitting channel. The excited light and the first part of the excitation light are combined in the light exciting channel, and the combined light emitted from the light exciting channel meets predetermined brightness and color temperature requirements. In this embodiment, the excitation light may be blue excitation light, the excited light is yellow excited light, and the combined light in the light-emitting channel may be white light.

Compared with the prior art, in the light source device 100 of the present disclosure, since the excitation light having the first polarization state is adopted, the transparent substrate 104 can guide the first part of the excitation light to the scattering area 109 and can guide the second part of the excitation light to the wavelength conversion area 110 through the light splitter 105 directly or indirectly. The first part of the excitation light after being scattered and emitted from the scattering area 109 is guided to the light-emitting channel through the transparent substrate 104 and the light splitter 105, and the excited light emitted from the wavelength conversion area 110 is also guided to the light exciting channel, so that the combined light emitted from the light exciting channel meets the predetermined brightness and color temperature. The light utilization efficiency of the light source device 100 is high since the light loss can be controlled to be small due to the excitation light having the first polarization state cooperating with the transparent substrate.

In addition, in the light source device 100 of the present disclosure, the scattering area 109 and the wavelength conversion area 110 are further integrated on a wavelength conversion element 111, so that the overall optical path structure is more compact, and thereby the light source device 100 can be miniaturized. Particularly, in the first embodiment, the transparent substrate 104, the light splitter 105, and the guiding element 106a cooperate with the wavelength conversion element 111 to obtain the predetermined brightness and color temperature requirements in the light exciting channel, from which it can be seen that a structure of the light source device 100 is compact and can achieve miniaturization of the light source device 100 well.

Furthermore, the scattering area 109 and the wavelength conversion area 110 of the wavelength conversion element 111 both are ring-shaped, which is beneficial to dissipate the heat generated by the wavelength conversion element 111 during a working time. Especially in one embodiment, the scattering area 109 is on the inner ring, and the wavelength conversion area 110 is on the outer ring. It is mainly considered that the heat of the wavelength conversion element 111 mainly comes from the heat released during wavelength conversion, and it is beneficial for dissipation of the heat to arrange the wavelength conversion area 110 on the outer ring. Of course, it should be understood that in a modified embodiment, positions of the scattering area 109 and the wavelength conversion area 110 can also be exchanged, that is, the scattering area 109 is on the outer ring and the wavelength conversion area 110 is on the inner ring. In such a case, the dissipation effect is week, but the normal operation of the light source device is not affected.

In detail, referring to the curves shown in FIG. 6, by estimating the light loss on a basis of the reflectivity of the surface of the transparent substrate 104 to the excitation light having the S polarization state being 9%, it is known that the first part of the excitation light provided to the scattering area 109 is approximately 17%. The 17% of the excitation light (that is, the first part of excitation light) reaches the transparent substrate 104 again after scattered by the scattering area 109. Similarly, there is about 9% of the excitation light having the S polarization state is reflected but not transmitted to the light-emitting channel, at the same time, about 1% of the excitation light having the P polarization state is reflected and lost. Therefore, about 10% of the excitation light is lost when the 17% of the excitation light passes through the transparent substrate 104 again. Therefore, the overall loss of the excitation light caused by use of the transparent substrate 104 is about 17%*10%, that is, 1.7%. It can be seen that the light source device 100 can greatly reduce light loss and improve light utilization due to the use of the transparent substrate. Further, the transparent substrate 104 can be white glass, and the reflection curve is its inherent physical property. A variation range of the reflectivity will be narrow as long as a refractive index of the material and the angle for fixing can be secured, which is easy to implement in engineering. Therefore, on the basis of achieving a higher light utilization rate, an implementation cost of the light source device 100 is also low.

Therefore, in summary, the light source device of the present disclosure can realize a compact light source structure conveniently and inexpensively, reduce the volume of the light source, and achieve better beneficial effects by comprehensively consideration on light efficiency, cost, and implementation difficulty.

Figure 7:
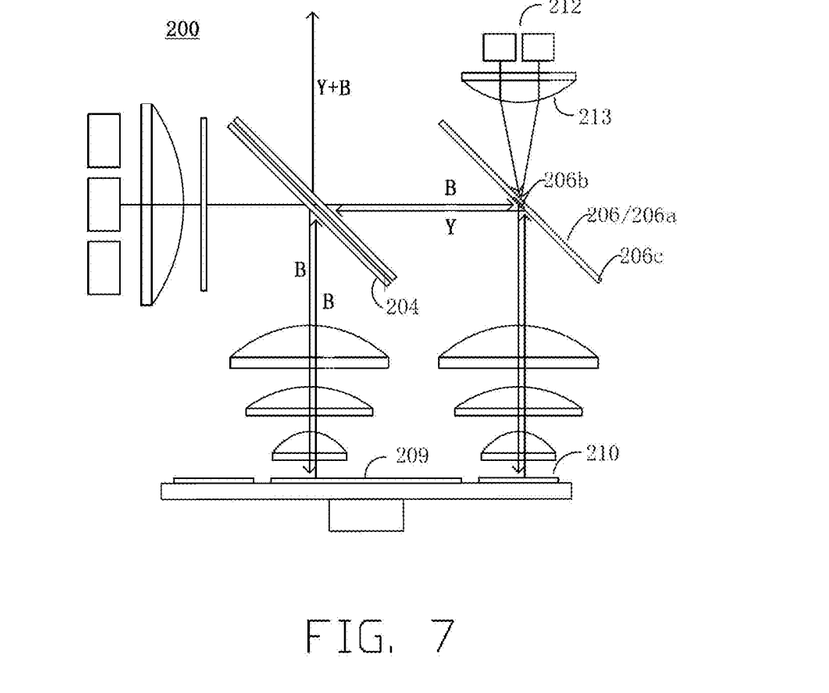
FIG. 7 is a schematic diagram of a structure of a light source device based on a second embodiment of the present disclosure.

Please refer to FIG. 7, FIG. 7 is a schematic diagram of a structure of a light source device based on a second embodiment of the present disclosure. The light source device 200 is substantially the same as the light source device 100 of the first embodiment. In other words, the above description of the light source device 100 of the first embodiment can basically be applied to the light source device 200 of the second embodiment. Differences between the two light source devices mainly lie in that: the light source device 200 further includes a supplementary light source 212 configured to emit at least one of first supplementary light and second supplementary light to improve at least one of light-emitting brightness and color quality, and at least one of the first supplementary light and the second supplementary light are also guided to the light-emitting channel.

Specifically, in the second embodiment, at least one of the first supplementary light and the second supplementary light emitted from the supplementary light source 212 is provided to (such as transmitted to) the wavelength conversion area 210 through the guiding element 206a, the wavelength conversion area 210 provides (such as by reflecting) at least one of the first supplementary light and the second supplementary light to the guiding element 206a after scattering at least one of the first supplementary light and the second supplementary light, and the guiding element 206a guides (such as by reflecting) at least one of the first supplementary light and the second supplementary light to the light-emitting channel through the light splitter 204.

The supplementary light source 212 may include a laser, at least one of the first supplementary light and the second supplementary light may include laser light, and mixed light of the first supplementary light and the second supplementary light may be the same color as the excited light. In other words, the first supplementary light and the second supplementary light have primary light of same color (such as red light or green light) as that included in the excited light. In this embodiment, the first supplementary light may be green laser light, and the second supplementary light may be red laser light. Therefore, the supplementary light source 212 may include a first supplementary light source emitting the green laser light and a second supplementary light source emitting the red laser light.

Since at least one of the first supplementary light and the second supplementary light have a relative long wavelength and are laser lights, at least one of the first supplementary light and the second supplementary light will not cause excited light on the wavelength conversion area 210 and will be scattered into Lambertian light and then reflected. As such, a coherence of at least one of the first supplementary light and the second supplementary light can be eliminated, and thereby avoiding a speckle on a screen and achieving the combination of the laser light and the excited light.

Further, it should be understood that the guiding element 206a may be a partially coated light splitter, which may include a first area 206b and a second area 206c. The first area 206b may be in the center of the second area 206c. The first area 206b can transmit the excited light, the first supplementary light, and the second supplementary light (for example transmitting yellow light) but reflect the excitation light (for example reflecting blue light), and the second area 206c can reflect the excited light, the first supplementary light, and the second supplementary light (for example transmitting yellow light).

It should be understood that the light source device 200 may also include a convergent lens 213 for converging at least one of the first supplementary light and the second supplementary light before providing at least one of the first supplementary light and the second supplementary light to the guiding device 206, wherein the convergent lens 213 may be another lens system capable of compressing and condensing light beams.

Figure 8:
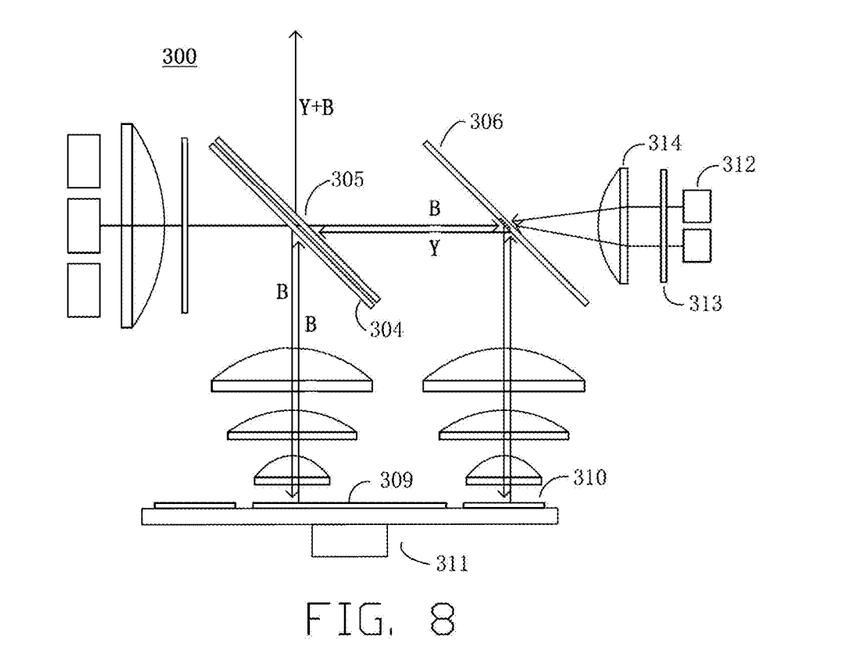
FIG. 8 is a schematic diagram of a structure of a light source device based on a third embodiment of the present disclosure.

Please refer to FIG. 8, FIG. 8 is a schematic diagram of a structure of a light source device based on a third embodiment of the present disclosure. The light source device 300 is substantially the same as the light source device 200 of the second embodiment. That is, the above description of the light source device 200 of the second embodiment can basically be applied to the light source device 300 of the third embodiment. Differences between the two light source device mainly lie in that: the light source device 300 further includes a scattering and decoherence device 313, at least one of the first supplementary light and the second supplementary light emitted from the supplementary light source 312 is guided to the light exciting channel through the scattering and decoherence device 313, the converging lens 314, and the guiding element 306 sequentially, and the light splitting sheet 305 guides at least one of the first supplementary light and the second supplementary light to the light-emitting channel.

It should be understood that, in the third embodiment, the guiding element 306a may be an partially coated light splitter, which may include a first area 306b and a second area 306c. The first area 306b may be located in the center of the second area 306c. The first area 306b can transmit the first supplementary light and the second supplementary light (such as transmitting yellow light) and reflect the excitation light (such as blue light), and the second area 306c can reflect the laser light (such as reflecting yellow light) and reflect the excitation light (such as blue light).

In the third embodiment, since at least one of the first supplementary light and the second supplementary light are decohered by the scattering and decoherence device 313, there is no need to provide at least one of the first supplementary light and the second supplementary light to the wavelength conversion element 311 for decoherence. This kind of light combining scheme further needs a light source device for the scattering and decoherence of the laser light.

Figure 9:
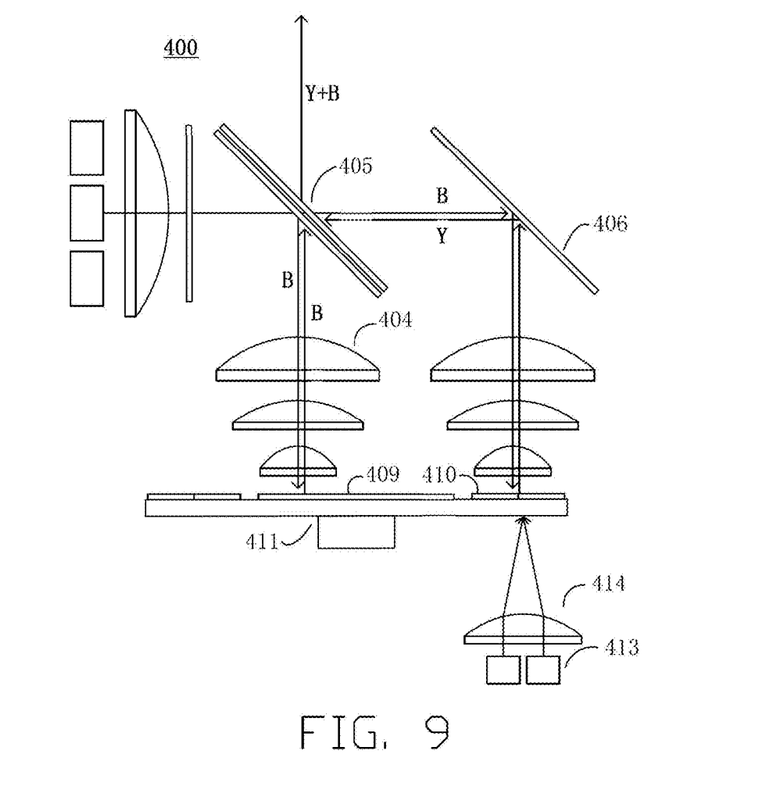
FIG. 9 is a schematic diagram of a structure of a light source device based on a fourth embodiment of the present disclosure.
Figure 10:
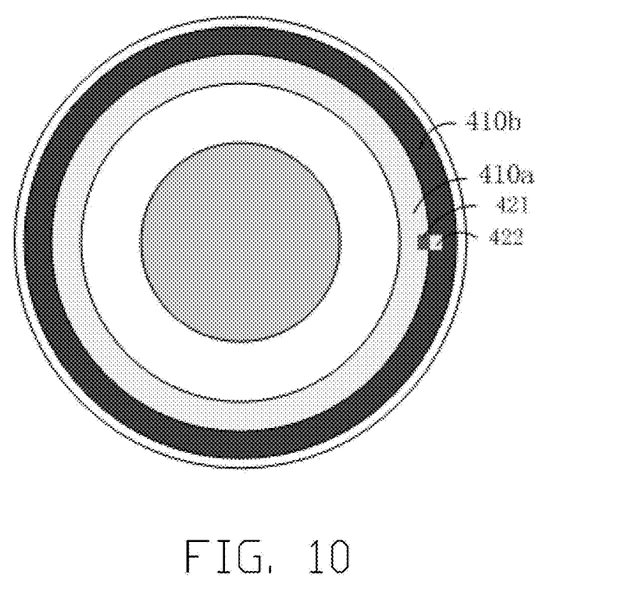
FIG. 10 is a schematic diagram of a structure of a wavelength conversion element of the light source device shown in FIG. 9.

Please refer to FIG. 9 and FIG. 10. FIG. 9 is a schematic diagram of a structure of a light source device based on a fourth embodiment of the present disclosure, and FIG. 10 is a schematic diagram of a structure of a wavelength conversion element of the light source device shown in FIG. 9. The light source device 400 is substantially the same as the light source device 200 of the second embodiment. In other words, the above description of the light source device 200 of the second embodiment can basically be applied to the light source device 400 of the fourth embodiment. Differences between the two light source devices mainly lie in that: the supplementary light source 413 is configured to emit at least one of the first supplementary light and the second supplementary light to the wavelength conversion area 410 including a first area 410a and a second area 410b, the first area 410a and the second area 410b are both ring-shaped and one of the first area 410a and the second area 410b is nested around the other one, the first area 410a is configured to generate the excited light, the second area 410b is configured to scatter at least one of the first supplementary light and the second supplementary light and then provide to the guiding element 406, and the guiding element 406 is configured to guide (such as by reflecting) at least one of the first supplementary light and the second supplementary light to the light-emitting channel through the light splitter 405.

As shown in FIG. 10, a light spot formed by the second part of the excitation light on the wavelength conversion element 411 may be shown as 421. A light spot formed by at least one of the first supplementary light and the second supplementary light from the supplementary light source 413 on the wavelength conversion element 411 may be shown as 422.

It can be seen that the light source device 400 of the fourth embodiment can also achieve a purpose of adding supplementary light to improve at least one of brightness and color quality of the light source device 400.

Figure 11:
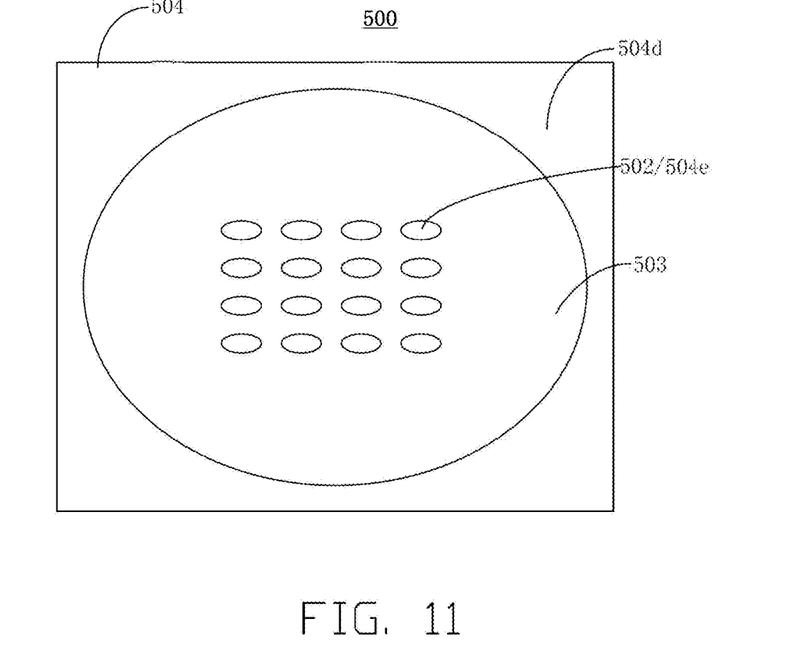
FIG. 11 is a schematic plan view of a transparent substrate of a light source device based on a fifth embodiment of the present disclosure.

Please refer to FIG. 11, FIG. 11 is a schematic plan view of a transparent substrate of a light source device based on a fifth embodiment of the present disclosure. The light source device 500 of the fifth embodiment is substantially the same as the light source device 100 of the first embodiment. That is to say, the above description of the light source device 100 of the first embodiment can basically be applied to the fifth embodiment. Differences between the two light source devices mainly lie in that: the structure of the transparent substrate 504 of the light source device 500 is slightly different.

Specifically, the excitation light source includes a plurality of lasers, and the plurality of lasers can form a plurality of excitation light spots 502 on the transparent substrate 504. The transparent substrate 504 includes a substrate and an anti-reflection film 504d. The anti-reflection film 504d includes a plurality of opening areas 504e corresponding to the plurality of excitation light spots 502 one by one.

Figure 12:
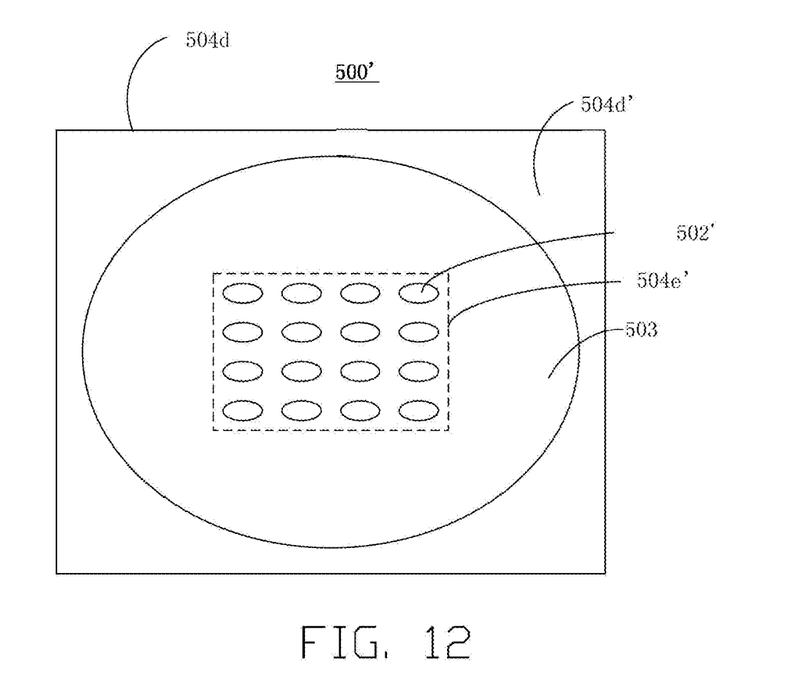
FIG. 12 is a schematic plan view of a transparent substrate of a light source device based on a modified embodiment of FIG. 11.

However, please refer to FIG. 12 for a modified embodiment. FIG. 12 is a schematic plan view of a transparent substrate 504' of a light source device 500' based on a modified embodiment of FIG. 11. The anti-reflection film 504d' may also include an opening area 504e', and the opening area 504e' corresponds to the plurality of excitation light spots 502' and spacing areas among the plurality of excitation light spots 502'.

For the above-mentioned fifth embodiment and its modified embodiments, a principle of an optical path is basically the same as that of the first embodiment and will not be repeated here. But what needs to be explained is that the first part of the excitation light (approximately Lambertian light) scattered by the scattering area also forms scattered light spots 503 or 503' on the transparent substrate 504 or 504'. An area of each of the scattered light spots 503 or 503' is much larger than an area of each of the excitation light spots 502 or 502'. In an embodiment, a ratio of the area of the excitation light spot 502 or 502' to the area of the scattered light spot 503 or 503' may be about 8%. While in the fifth embodiment, the laser excitation light spot 502 only needs to be located on the transparent substrate 504 to meet the requirement of reflecting the first part of excitation light. Therefore, the transparent substrate 504 can be coated with an anti-reflection coating in areas except where the excitation light spot 502 is located (that is, arranging the anti-reflection coating 504d with multiple opening areas 504e as shown in FIG. 11), to increase the transmittance of the first part of the excitation light scattered back. The anti-reflection film 504d with the plurality of opening areas 504e can theoretically reduce the light loss from 10% (that is, 9% loss of light having the S polarization state plus 1% loss of light having the P polarization state) to 1%. However, considering a simplicity of actual coating, as shown in FIG. 12, an opening area 504e' may be provided in the peripheral area of the plurality of excitation light spots 502' and the spacing area between the plurality of excitation light spots 502' (the rectangular area shown in the figure), and the loss can be reduced from 10% to 3% theoretically, thereby also achieving a better effect of reducing light loss and improving light utilization.

The present disclosure also provides a display apparatus, which can be applied to projectors, LCD (Liquid Crystal Display) displays, etc. The display apparatus may include a light source device, a spatial light modulator, and a projection lens. The light source device adopts the light source device 100, 200, 300, 400, 500, 500' in the above-mentioned embodiment and the light source device of the modified embodiment. The spatial light modulator is configured to modulate images based on light emitted from the light source device and input image data to output image light. The projection lens is configured to project based on the image light to display a projected image. A display apparatus adopting light source devices 100, 200, 300, 400, 500, and 500' in the above-mentioned embodiment and the modified embodiment thereof has a technical effect of high brightness, compact structure, and small volume.

In addition, it should be understood that the light source devices 100, 200, 300, 400, 500, and 500' in the above-mentioned embodiments of the present disclosure and the light source devices of the modified embodiments can also be used in stage lighting systems, vehicle lighting systems, surgical lighting systems, etc. It is not limited to the above-mentioned display apparatuses.

It should be understood that, in each of the above embodiments, the various elements (such as light splitting element, guiding element, and light combining element) can "guide" light in a way of "transmissive-type" or "reflective-type", which can be realized by at least one of wavelength splitting/synthesis, polarization splitting/synthesis, and area splitting/synthesis, etc. Because various changing embodiments cannot be enumerated one by one, not all modified embodiments are listed out here. However, a person having ordinary skill in the art can complete a variety of modified embodiments based on the content recorded in this disclosure to realize the "guide".

The above descriptions illustrate the various embodiments of the present invention, and do not limit the scope of the invention. Equivalent structures or processes based on the disclosure of this specification and drawings, or their direct or indirect applications in other related technology areas, are within the scope of protection of this invention.

The invention claimed is:

1. A light source device, comprising an excitation light source, a wavelength conversion element, a transparent substrate, and a light splitter, the wavelength conversion element comprising a wavelength conversion area and a scattering area, wherein
the excitation light source is configured to emit excitation light having a first polarization state;
the transparent substrate is configured to guide a first part of the excitation light to the scattering area, and to guide a second part of the excitation light to the light splitter which guides the second part of the excitation light to the wavelength conversion area directly or through a guiding device;
the scattering area is configured to scatter the first part of the excitation light and to guide the first part of the excitation light after being scattered to the transparent substrate, the transparent substrate and the light splitter are further configured to guide the first part of the excitation light after being scattered to a light-emitting channel directly or through the guiding device; the wavelength conversion area is configured to perform wavelength conversion on the second part of the excitation light to generate excited light and to guide the excited light to the light-emitting channel directly or through the guiding device, or through the guiding device and the light splitter.

2. The light source device of claim 1, wherein the wavelength conversion area has a ring shape, and the scattering area is at a center of the ring shape of the wavelength conversion area.

3. The light source device of claim 2, wherein a spacing area is arranged between the wavelength conversion area and the scattering area, wherein the spacing area and the wavelength conversion area both are ring-shaped, the scattering area is circular, and the scattering area, the spacing area, and the wavelength conversion area are concentric.

4. The light source device of claim 1, further comprising a supplementary light source configured to emit at least one of first supplementary light and second supplementary light to improve at least one of luminous brightness and color quality of the light source device, and at least one of the first supplementary light and the second supplementary light are also guided to the light-emitting channel.

5. The light source device of claim 4, wherein the guiding device comprises a guiding element, the light splitter is configured to guide the second part of the excitation light to the wavelength conversion area through the guiding element, and the wavelength conversion area is configured to guide the excited light to the light-emitting channel through the guiding device and the light splitter.

6. The light source device of claim 5, wherein at least one of the first supplementary light and the second supplementary light emitted from the supplementary light source is guided to the wavelength conversion area through the guiding element, the wavelength conversion area is configured to provide at least one of the first supplementary light and the second supplementary light to the guiding element after scattering at least one of the first supplementary light and the second supplementary light, the guiding element is configured to guide at least one of the first supplementary light and the second supplementary light to the light-emitting channel through the light splitter.

7. The light source device of claim 5, wherein the light source device further comprises a scattering and decoherence device, at least one of the first supplementary light and the second supplementary light emitted from the supplementary light source is guided to the light splitter through the scattering and decoherence device and the guiding element, and the light splitter is configured to guide at least one of the first supplementary light and the second supplementary light to the light-emitting channel.

8. The light source device of claim 5, wherein the supplementary light source is configured to emit at least one of the first supplementary light and the second supplementary light to the wavelength conversion area, the wavelength conversion area comprises a first area and a second area, the first area and the second area are both ring-shaped and one of the areas is nested outside the other area, the first area is configured to generate the excited light, and the second area is configured to scatter and provide at least one of the first supplementary light and the second supplementary light to the guiding element, and the guiding element is configured to guide at least one of the first supplementary light and the second supplementary light to the light-emitting channel through the light splitter.

9. The light source device of claim 1, wherein the excitation light source comprises a plurality of lasers configured to form a plurality of excitation light spots on the transparent substrate, the transparent substrate comprises a substrate and an anti-reflection film, and the anti-reflection film comprises at least one opening area corresponding to the plurality of excitation light spots.

10. The light source device of claim 9, wherein the anti-reflection film comprises a plurality of opening areas which is in a one-to-one correspondence to the plurality of excitation light spots.

11. The light source device of claim 9, wherein the anti-reflection film comprises one opening area corresponding to the plurality of excitation light spots and spacing areas between the plurality of excitation light spots.

12. The light source device of claim 1, wherein the light source device further comprises a convergent lens and a light homogenization device, the excitation light emitted from the excitation light source is guided to the transparent substrate through the convergent lens and the light homogenization device, and wherein the light source device further comprises a collection lens module arranged adjacent to at least one of the scattering area and the wavelength conversion area and configured to collect and concentrate the excited light generated by the wavelength conversion area, light provided to the scattering area, and at least one of light emitted from the scattering area and light provided to the wavelength conversion area.

13. The light source device of claim 1, wherein the transparent substrate is white glass.

14. The display apparatus of claim 10, wherein the supplementary light source is configured to emit at least one of the first supplementary light and the second supplementary light to the wavelength conversion area, the wavelength conversion area comprises a first area and a second area, the first area and the second area are both ring-shaped and one of the areas is nested outside the other area, the first area is configured to generate the excited light, and the second area is configured to scatter and provide at least one of the first supplementary light and the second supplementary light to the guiding element, and the guiding element is configured to guide at least one of the first supplementary light and the second supplementary light to the light-emitting channel through the light splitter.

15. A display apparatus, comprising a light source device comprising an excitation light source, a wavelength conversion element, a transparent substrate, and a light splitter, the wavelength conversion element comprising a wavelength conversion area and a scattering area, wherein:
the excitation light source is configured to emit excitation light having a first polarization state;
the transparent substrate is configured to guide a first part of the excitation light to the scattering area, and to guide a second part of the excitation light to the light splitter which guides the second part of the excitation light to the wavelength conversion area directly or through a guiding device;
the scattering area is configured to scatter the first part of the excitation light and to guide the first part of the excitation light after being scattered to the transparent substrate, the transparent substrate and the light splitter are further configured to guide the first part of the excitation light after being scattered to a light-emitting channel directly or through the guiding device; the wavelength conversion area is configured to perform wavelength conversion on the second part of the excitation light to generate excited light and to guide the excited light to the light-emitting channel directly or through the guiding device, or through the guiding device and the light splitter.

16. The display apparatus of claim 15, wherein the wavelength conversion area has a ring shape, and the scattering area is at a center of the ring shape of the wavelength conversion area.

17. The display apparatus of claim 16, wherein a spacing area is arranged between the wavelength conversion area and the scattering area, wherein the spacing area and the wavelength conversion area both are ring-shaped, the scattering area is circular, and the scattering area, the spacing area, and the wavelength conversion area are concentric.

18. The display apparatus of claim 15, further comprising a supplementary light source configured to emit at least one of first supplementary light and second supplementary light to improve at least one of luminous brightness and color quality of the light source device, and at least one of the first supplementary light and the second supplementary light are also guided to the light-emitting channel.

19. The display apparatus of claim 18, wherein the guiding device comprises a guiding element, the light splitter is configured to guide the second part of the excitation light to the wavelength conversion area through the guiding element, and the wavelength conversion area is configured to guide the excited light to the light-emitting channel through the guiding device and the light splitter.

20. The display apparatus of claim 19, wherein at least one of the first supplementary light and the second supplementary light emitted from the supplementary light source is guided to the wavelength conversion area through the guiding element, the wavelength conversion area is configured to provide at least one of the first supplementary light and the second supplementary light to the guiding element after scattering at least one of the first supplementary light and the second supplementary light, the guiding element is configured to guide at least one of the first supplementary light and the second supplementary light to the light-emitting channel through the light splitter.

* * * * *